United States Patent [19]
Case et al.

[11] Patent Number: 6,000,206
[45] Date of Patent: *Dec. 14, 1999

[54] IN-LINE RECTANGULAR BALER SELECTIVELY OPERABLE IN CENTERED OR OFF-SET POSITIONS

[75] Inventors: Cecil L. Case, Newton; Edward Wesley Esau, Hesston, both of Kans.

[73] Assignee: Hay & Forage Industries, Hesston, Kans.

[ * ] Notice: This patent issued on a continued prosecution application filed under 37 CFR 1.53(d), and is subject to the twenty year patent term provisions of 35 U.S.C. 154(a)(2).

[21] Appl. No.: 08/726,243

[22] Filed: Oct. 4, 1996

[51] Int. Cl.⁶ ..................................... A01D 39/00
[52] U.S. Cl. ................................. 56/341; 100/88
[58] Field of Search ............................. 56/341, 343, 432, 56/433, 434, 436, 437, 10.2 R, 16.4 R, DIG. 14; 100/88, 89

[56] References Cited

U.S. PATENT DOCUMENTS

| | | |
|---|---|---|
| 3,832,837 | 9/1974 | Burkhart et al. . |
| 3,868,811 | 3/1975 | Cicci et al. . |
| 3,911,649 | 10/1975 | Scarnato et al. . |
| 4,018,036 | 4/1977 | Cicci . |
| 4,042,140 | 8/1977 | McFarland . |
| 4,065,914 | 1/1978 | Phillips et al. . |
| 4,106,267 | 8/1978 | White ..................................... 56/341 X |
| 4,204,790 | 5/1980 | Baxter . |
| 4,411,571 | 10/1983 | Gildon . |
| 4,413,553 | 11/1983 | Crawford ............................. 56/343 X |
| 4,433,533 | 2/1984 | Giani . |
| 4,524,574 | 6/1985 | Ratzlaff . |
| 4,711,078 | 12/1987 | Schaible et al. .......................... 56/341 |
| 4,782,651 | 11/1988 | Ratzlaff . |
| 4,819,418 | 4/1989 | Ratzlaff et al. . |
| 5,076,042 | 12/1991 | Koorn et al. .................. 56/DIG. 14 X |
| 5,211,345 | 5/1993 | Siebenga . |
| 5,220,772 | 6/1993 | Koskela et al. . |
| 5,224,323 | 7/1993 | Fykse . |
| 5,255,501 | 10/1993 | McWilliams . |
| 5,323,591 | 6/1994 | Inman et al. . |

OTHER PUBLICATIONS

John Deere Sales Brochure No. DKA16, "Rectangular Balers", "STACK 'EM UP! Square Bales that Stack Like Bricks", pp. 1–8. (Date unknown).

Sperry New Holland Sales Brochure No. 31050510–10—83 L.V.D., "16×23 Baler 505" (all pages). (Date unknown).

Vicon Sales Brochure No. SP 451–461–471–481.E.067.86.111, "High capacity square balers" (all pages). (Date unknown).

*Primary Examiner*—H. Shackelford
*Attorney, Agent, or Firm*—Hovey, Williams, Timmons & Collins

[57] ABSTRACT

The in-line baler has its crop pickup, baling chamber and compacting plunger all located on the same fore-and-aft axis as viewed in top plan, but the tongue of the baler can be selectively swung by a hydraulic cylinder from a centered position to an offset position so that the baler may be correspondingly operated either directly behind the towing vehicle or off to one side as desired by the operator. To compensate for an otherwise excessive weight transfer onto the outboard ground wheel when the baler is shifted to the offset location, the onboard internal combustion engine and other drive apparatus for the operating components of the baler are all located off to one side of the center line of the machine, i.e., toward the inboard ground wheel. The pivot point for the tongue is located forwardly of the transverse axis of the ground wheels and slightly to the inboard side of the central axis of the baler, between the pickup and the overhead baling chamber.

14 Claims, 3 Drawing Sheets

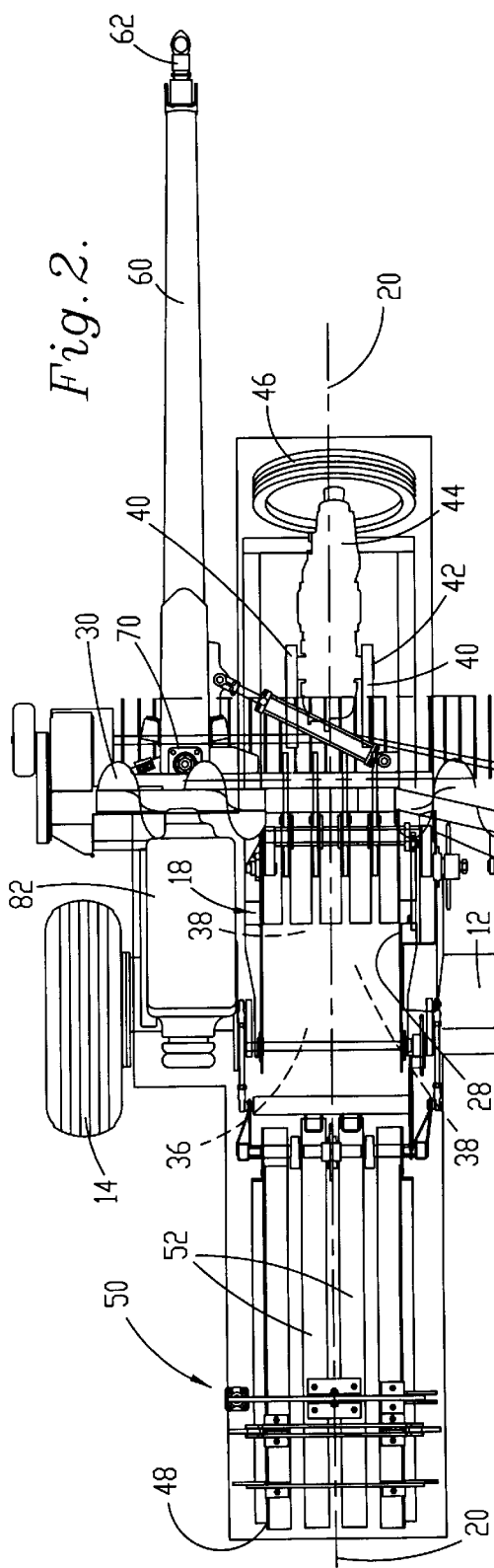
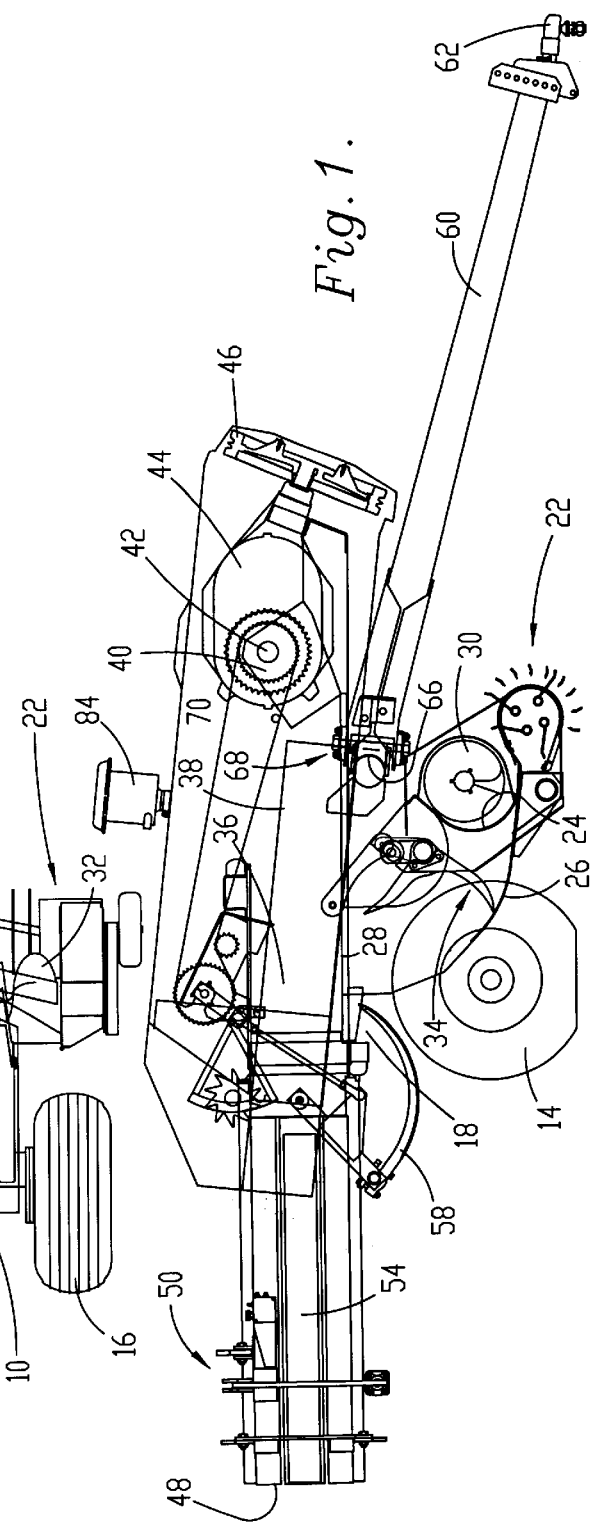

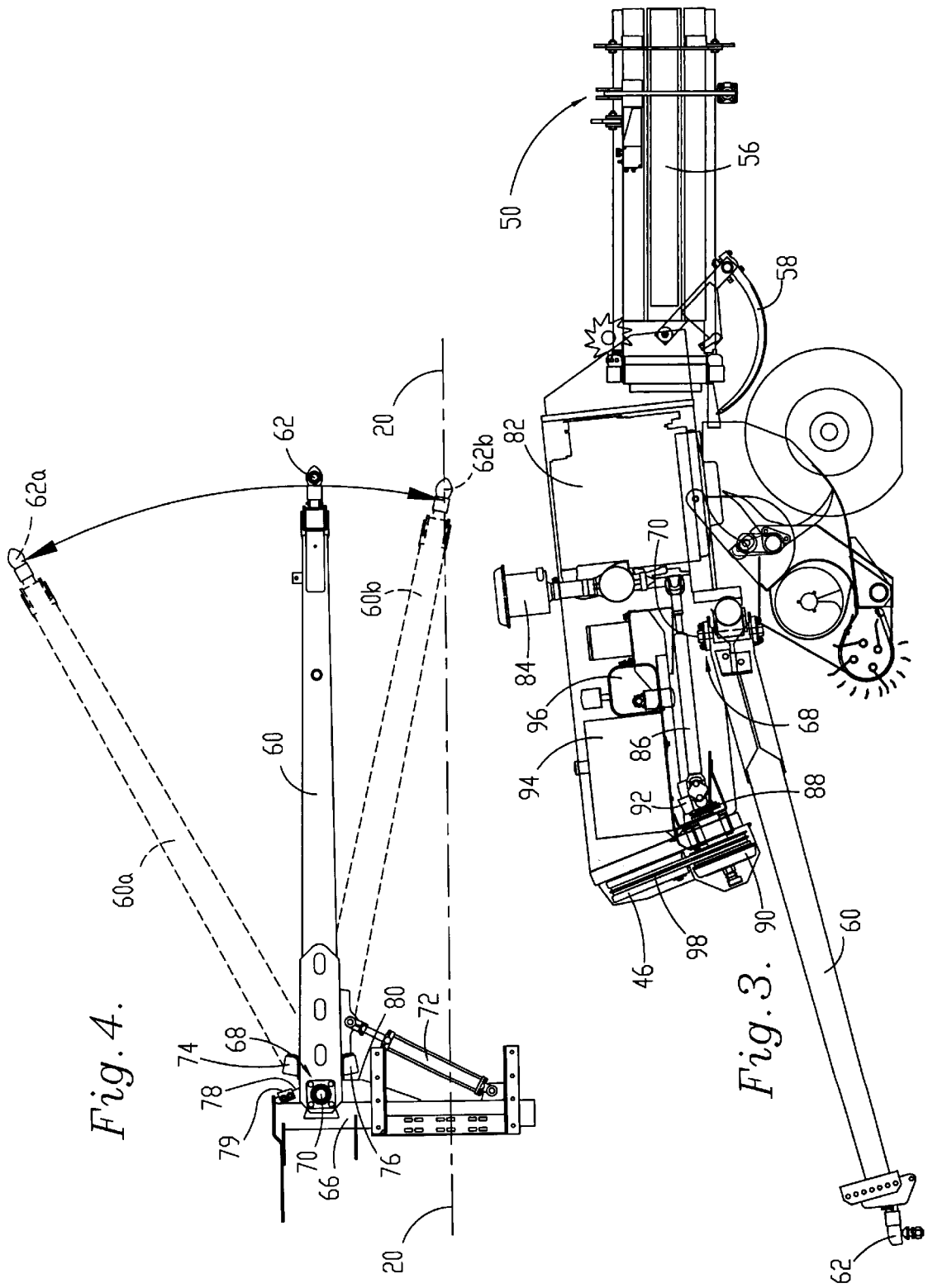

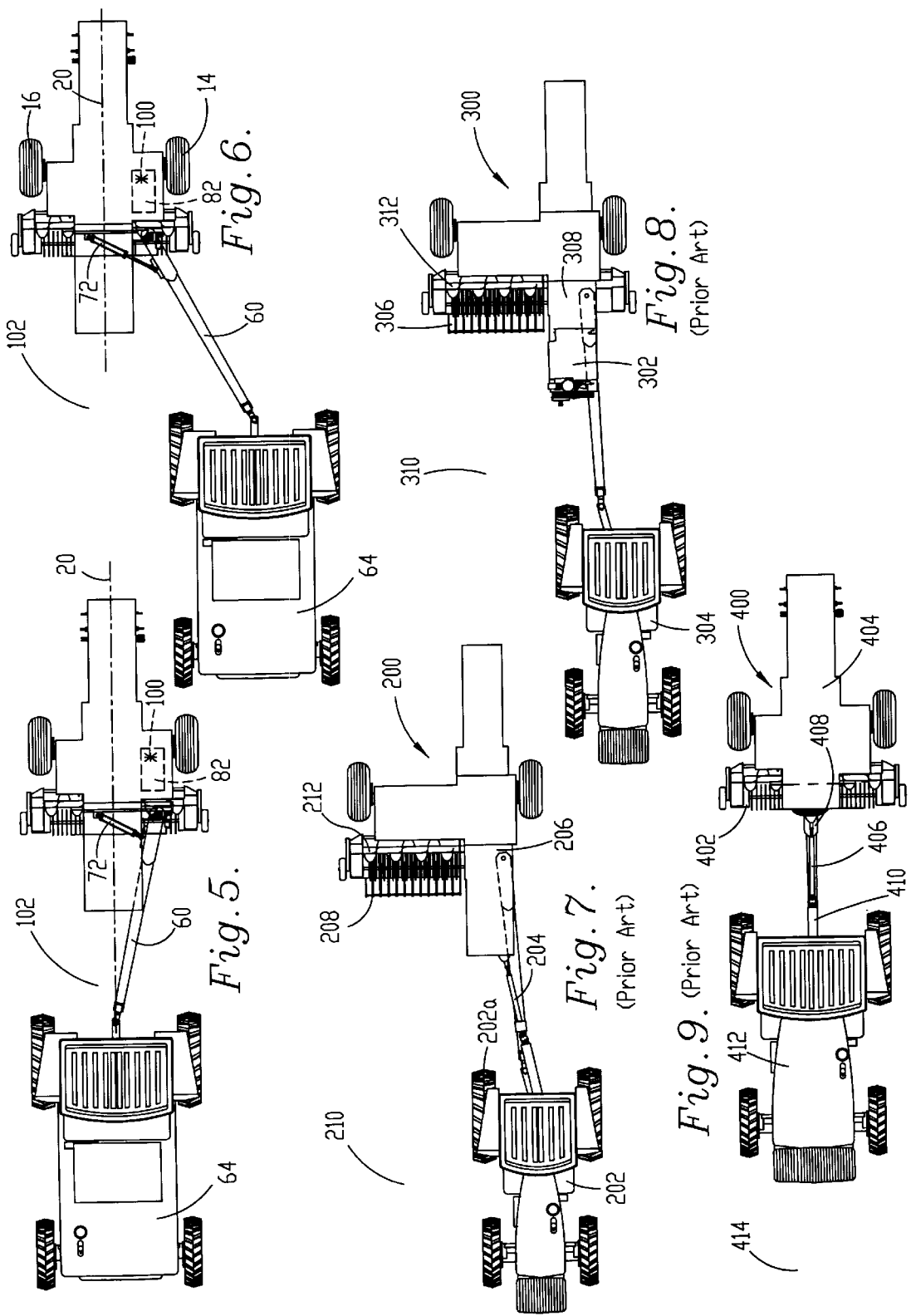

IN-LINE RECTANGULAR BALER SELECTIVELY OPERABLE IN CENTERED OR OFF-SET POSITIONS

CROSS-REFERENCE TO RELATED APPLICATIONS

See also the following contemporaneously filed applications for U.S. Letters Patent: Ser. No. 08-726,390, entitled FOUR-SIDE SQUEEZE MECHANISM FOR EXTRUSION-TYPE SQUARE BALER; and Ser. No. 08-720,950, entitled BOTTOM LOADING, IN-LINE SQUARE BALER WITH DUAL PURPOSE STUFFER.

TECHNICAL FIELD

The present invention relates to crop balers and, more particularly, to "square" or "rectangular" balers of the "in-line" type in which the crop pickup, the baling chamber and the reciprocating plunger for the chamber are all located on the same longitudinal, fore-and-aft axis as viewed from the top of the machine. In this type of baler, the crop material flows straight through the machine from front to rear without left or right turns as it is picked up from the ground, moved into the baling chamber, and then packed rearwardly toward the discharge outlet.

BACKGROUND

In-line balers permit the operator to drive straight down the windrow with the wheels of the towing vehicle straddling the windrow to avoid running over the gathered crop material. The baler follows directly behind, sweeping up the material and stuffing it up into an overhead baling chamber where it is compacted rearwardly toward a discharge orifice. One distinct advantage of this type of arrangement is that the heavy reciprocating plunger of the machine is directly in line with the towing vehicle such that no force moments are created by plunger reciprocations that would tend to swing the baler about the vehicle. Moreover, the center of gravity of the machine is located directly on or close to the center line path of travel of both the vehicle and the baler so that the load is evenly distributed between the left and right ground wheels of the baler.

In some situations, however, it may be desirable for the in-line baler to be towed in an offset position wherein the towing vehicle is located off to one side of the windrow. For example, in some regions of the country, the operating components of balers are powered by onboard internal combustion engines, rather than the power take-off shaft of the towing vehicle, thus permitting the balers to be towed by vehicles that do not have power take-off shafts. Such vehicles typically have ground clearances, however, which are significantly less than that available in standard high clearance tractors. Therefore, the vehicles must be run beside the windrows instead of centered upon and straddling windrows.

Currently, side delivery balers in which the windrow is picked up off to one side of the baling chamber and then fed laterally into the chamber for rearward compaction, are available which permit the vehicle to be run alongside the windrow while the pickup is centered on the windrow. However, no in-line baler which can be selectively pulled directly behind the vehicle while it straddles the windrow, or off to one side of the vehicle while the vehicle runs alongside the windrow, is currently commercially available.

SUMMARY OF THE PRESENT INVENTION

Accordingly, one important object of the present invention is to provide a rectangular baler which incorporates all of the advantages inherent in an in-line baler but which can be selectively operated with equal success in either a centered location directly behind the towing vehicle or an offset location disposed off to one side of the towing vehicle.

In carrying out this object, an important consideration resides in the fact that, in the offset position, the reciprocating plunger of the in-line baler will be situated off to one side of the towing vehicle. This has the potential for creating significant weight distribution problems inasmuch as the weight of the plunger will no longer be centered on the path of travel of the vehicle. This problem may be compounded if the baler is provided with an onboard, internal combustion engine which, in currently available side delivery models, is typically mounted on the baler in line with the reciprocating plunger. Following that practice in an in-line baler would cause an even greater amount of weight to be shifted to the outboard ground wheel of the baler when the baler was in the offset position.

Thus, the present invention further contemplates that when the in-line baler is to be provided with an onboard internal combustion engine, such engine will be located off to one side of the center line of the machine closer to the inboard ground wheel than the outboard wheel such that the center of gravity of the baler is correspondingly repositioned. This reduces the amount of weight transfer to the outboard ground wheel when the baler is in the offset location so as to correspondingly reduce the adverse effect of such transfer.

In its preferred form, the offsetable, in-line baler of the present invention has its internal combustion engine situated just forwardly of the wheel axle of the chassis of the baler such that the center of gravity of the machine is not only off to the towing side or inboard side of the baler but is also in front of the ground wheels. The towing tongue of the baler can be shifted hydraulically from the tractor seat between its offset and centered positions to maximize operator convenience. The pivot point for the tongue at its point of connection to the chassis of the baler is disposed to one side of the center line of the baler, on the same side as the hitch when the tongue is in the offset position. The pivot point is located above the crop pickup and below the baling chamber, preferably on the left side of the center line of the machine so that the baler is disposed off to the right of the towing vehicle (as viewed from the rear) when the baler is in the offset position.

BRIEF DESCRIPTION OF THE DRAWINGS

FIG. 1 is a somewhat schematic, side elevational view of an in-line baler incorporating the principles of the present invention wherein the baler may be towed either directly behind the towing vehicle or laterally off to one side thereof as may be necessary or desirable;

FIG. 2 is a schematic top plan view of the in-line baler of FIG. 1;

FIG. 3 is a schematic, side elevational view of the opposite side of the baler of FIG. 1;

FIG. 4 is a fragmentary top plan view of the tongue region of the baler illustrating the point of connection between the tongue and the chassis and the hydraulic cylinder for selectively swinging the tongue between its two extreme operating positions;

FIG. 5 is a schematic top plan view of the baler during field operation when the baler is disposed in a centered position directly behind the towing vehicle;

FIG. 6 is a top plan view of the baler during field operation but with the baler in an offset position off to one side of the towing vehicle;

FIG. 7 is a top plan view of a prior art side delivery baler in field operation wherein the baler is driven from the power take-off shaft of the towing vehicle;

FIG. 8 is a top plan view of another prior art side delivery baler in field operation wherein the baler is provided with an onboard internal combustion engine for driving the operating components of the baler; and FIG. 9 is a top plan view of a prior art in-line baler in field operation centered directly behind the towing vehicle and having its operating components driven by the power take-off shaft of the towing vehicle.

DETAILED DESCRIPTION

The in-line baler 10 of FIGS. 1–6 has a wheeled chassis 11 including an axle 12 and a pair of laterally spaced ground wheels 14 and 16. The chassis 11 also carries a fore-and aft extending, rectangular baling chamber 18 that is centered between the two wheels 14,16 on the fore-and-aft axis 20 (FIG. 2). A windrow pickup header 22 is supported on the chassis 11 below the baling chamber 18, in front of the wheels, 14,16, and centered on the axis 20 for picking up the windrow of crop materials as the baler moves along. The materials lifted off the ground by the pickup 22 are delivered to the centrally disposed inlet 24 of an rearwardly and upwardly extending tubular duct 26 leading to an opening 28 (FIG. 2) in the bottom of the baling chamber 18. A pair of center-gathering stub augers 30 and 32 convey wide portions of the picked up windrow into the center of the machine in line with the inlet 24 of the duct 26. At that location, a stuffing fork 34 repeatedly sweeps rearwardly and upwardly through the duct 26 to load successive charges of materials up into the baling chamber 18 through the opening 28. Further details of construction and operation of the stuffing fork 34 may be found in co-pending application Ser. No. 08-720,950 filed Oct. 4, 1996 in the name of Edward Wesley Esau titled Bottom Loading In-Line Square Baler With Dual Purpose Stuffer.

A compacting plunger 36 is reciprocated fore-and-aft within the baling chamber 18 in timed relationship to the stuffing fork 34 so that each new charge loaded up into the chamber 18 by the fork 34 is compacted rearwardly by the plunger 36 during its compaction stroke. During such compaction stroke, the plunger 36 moves across the top of the duct 34 to close off the opening 28. At full compression it is disposed beyond the rear edge of the opening 28 as illustrated in FIG. 1. On the other hand, when fully retracted, the plunger 36 has withdrawn slightly beyond the opposite, forward edge of the opening 28 so as to admit the next charge of materials from the duct 26. A pair of laterally spaced connecting rods 38 for the plunger are operably coupled with corresponding cranks 40 at opposite left and right ends of the transverse output shaft 42 from a gear box 44. The gear box 44 receives driving input power from a large belt sheave 46 at the front of the machine.

Each charge of new hay in the baling chamber 18 is packed rearwardly by the plunger 36 against a body of previously compacted hay. Thus, the previously compacted materials provide a backstop for each freshly compacted charge, and the total compacted mass within the chamber 18 is inched rearwardly toward a rearmost discharge outlet 48 with each stroke of the plunger. The size of the outlet 48 and the side squeeze or pressure applied on the mass of materials between the outlet 48 and the rear face of the plunger 36 is determined by hydraulically controlled squeeze mechanism broadly denoted by the numeral 50. The squeeze mechanism 50 applies inwardly directed squeeze force to inwardly and outwardly movable top and side rails 52, 54 and 56 of the bale case. In its preferred form, the baler also has a bottom rail (not shown) that is movable inwardly and outwardly with respect to the baling chamber for applying controllable amounts of squeeze pressure from the bottom of the machine so that squeeze is actually applied from all four sides of the bale case. Further details of construction and operation of the four side squeeze mechanism 50 are disclosed in copending application Ser. No. 08-726,390 filed Oct. 4, 1996 in the names of Edward Wesley Esau et al and titled Four Side Squeeze Mechanism For Extrusion Type Square Baler.

A suitable knotter and tying mechanism is preferably provided (not shown) for binding bales of the crop material before they issue from the outlet 48. Knotting needles 58 (FIGS. 1 and 3) suspended below the baling chamber 18 may comprise a part of such mechanism, as well understood by those skilled in the art.

A towing tongue 60 has a hitch 62 at its forward end for connecting the baler with a towing vehicle 64 such as shown in FIGS. 5 and 6. At its rear end, the tongue 60 is connected to a horizontal cross-tube 66 of the chassis 11 by a pivot assembly 68 that includes a generally upright pivot 70. As illustrated in FIG. 4, for example, the pivot 70 enables the tongue 60 to swing back and forth in a generally horizontal plane between a pair of alternative positions illustrated in phantom lines. In the preferred embodiment, the baler is designed for operation either directly behind the towing vehicle 64 as illustrated in FIG. 5, or off to the right of the towing vehicle 65 as illustrated in FIG. 6. Thus, the pivot 70 for the tongue 60 is spaced to the left of the center line 20 as the machine is viewed from the rear so that the draft angle of the tongue 60 when in the offset position of FIG. 6 is not as severe as it would be if the pivot 70 were directly on the center line 20. As illustrated in FIG. 4. the left phantom line position of the tongue 60 corresponding to position 60a represents the offset position of the tongue 60 wherein the hitch 62a is spaced to the left of the center line 20. On the other hand, the right position of the tongue 60 represented by the phantom lines 60b in FIG. 4 correspond to the centered position of the tongue 60 in which the hitch 62b is directly on the center line 20, corresponding to the condition of things in FIG. 5.

A hydraulic swing cylinder 72 is connected between the cross-tube 66 and the tongue 60 for swinging the tongue 60 between its offset and centered positions. A pair of abutments 74 and 76 on opposite sides of the tongue 60 near the pivot 70 are disposed to engage corresponding stops 78 and 80 on the cross-tube 66 when the tongue 60 is in its offset and centered locations respectively for precluding movement of the tongue 60 beyond those extreme positions. The position of the left stop 78 may be effectively adjusted by bolting a small, rectangular extension plate 79 onto the primary stop 78. This correspondingly adjusts the location of the left offset position of the tongue 60. The cylinder 72 may be operated by suitable valve controls (not shown) at the seat of the towing vehicle 64 to enable the operator to change from the offset to centered positions without leaving the vehicle seat. Preferably, the control system for the swing cylinder 72 includes a valve that is capable of hydraulically locking the cylinder 72 in either of its extended or retracted conditions corresponding to the offset and centered locations of the tongue 60 respectively. It will be noted from FIG. 1 in particular that the pivot 70 for the tongue 60 is located forwardly of the ground wheels 14,16 and above the pickup 22 and below the bale chamber 18.

It will be seen from the foregoing description that the baler has numerous operating components that require driving power. These include the pickup 22, the stub augers 30,32, the plunger 36, the knotter and knotting needles 58, the squeeze mechanism 50, and the swing cylinder 72. Such driving power may be provided through a power take-off shaft on the towing vehicle (not shown) and a mechanical drive line (not shown) carried by the tongue 60. Or, as contemplated by the preferred embodiment, the source of driving power may be an onboard internal combustion engine and other apparatus all supported by the chassis 11 so that, except for certain controls, all of the operating and drive components for the baler are carried on the baler itself.

In the preferred embodiment, as illustrated particularly in FIGS. 2 and 3, an internal combustion engine 82 is mounted on the chassis 11 on the left side of the center line 20 just forwardly of the wheel axle 12. The exhaust pipe 84 for the engine 82 is shown in FIGS. 1 and 3. As shown in FIG. 3, a drive line 86 extends forwardly from the output shaft of the engine 82 and drives a pair of sheaves 88 and 90 near its forward end. The smaller sheave 88 provides a source of input power for a hydraulic pump 92 that supplies oil under pressure to the squeeze mechanism 50 and the swing cylinder 72. A gas tank 94 on the chassis 11 holds gasoline for the internal combustion engine 82, and an oil reservoir 96 on the chassis 11 supplies the pump 92 with oil for the squeeze mechanism 50, a pickup header lift (not shown) and the swing cylinder 72. It will be noted that all of the drive-related components just described, including the engine 82, the drive line 86, the sheaves 88 and 90, the pump 92, the tank 94 and the reservoir 96 are disposed on the left side of the center line 20 in front of the wheel axle 12 above the level of the tongue 60.

The sheave 90 at the front end of the drive line 86 is entrained by a double belt 98 that is also entrained about the large double flywheel sheave 46 at the front end of the gear box 44. The gear box 44, in turn, provides mechanical driving power for the pickup 22, the stub augers 30,32, the stuffer 34, the plunger 36 and the knotting mechanism including the needles 58. As a consequence of this arrangement of the various apparatus for driving the operating components of the baler, the center of gravity of the machine is located to the left of the center line 20 and forwardly of the wheel axle 12 as indicated by the asterisk 100 in FIGS. 5 and 6.

Operation

FIG. 7 illustrates a typical prior art side loading baler 200 utilizing the towing tractor 202 as a source of driving power for its operating components. A mechanical drive line 204 connects the baler with the power take-off shaft of the tractor 202. The fore-and-aft bale case 206 of the baler 200 is generally in line with the right rear tractor tire 202a, while the crop pickup 208 is disposed off to the right side of the bale case 206. This arrangement is thus intended for the tractor 202 to be run alongside of the windrow 210 as the pickup 208 is positioned in an offset location relative to the tractor 202. The pickup 208 lifts the windrowed materials off the ground and delivers them rearwardly into a cross-auger 212 or similar transfer mechanism that then delivers the material laterally into a side opening in the bale case 206 for compaction by the reciprocating plunger of the machine.

FIG. 8 illustrates another prior art side-loading baler 300 which is similar to the baler 200 except that baler 300 carries its own onboard internal combustion engine 302 for driving the operating components of the baler 300. Thus, the baler 300 has no mechanical drive line extending to the power take-off shaft of the towing vehicle 304. However, like the baler 200, the baler 300 is not an in-line baler such as the present invention. Instead, the pickup 306 of the baler 300 is offset to the right of the longitudinal axis defined by the bale case 308 and the reciprocating plunger (not shown) contained within the bale case 308. Thus, during field operations, the tractor 304 runs alongside the windrow 310, and the pickup 306 is disposed in an offset position relative to the tractor 304 to pick up the crops and present them to the side delivery auger 312 or similar mechanism.

FIG. 9 illustrates a prior art in-line baler 400 wherein the pickup 402, the bale case 404 and the plunger (not shown) within the bale case 404, are all disposed on the fore-and-aft center line of the baler as viewed in top plan. The baler 400 derives driving power for its operating components from a mechanical drive line 406 extending forwardly along the tongue 408 to the power take-off shaft 410 of the towing vehicle 412. The tongue 408 is in a fixed, centered position so that the baler 400 is always towed directly behind the tractor 412 straddling the windrow 414. Crop materials picked up by the pickup 402 are delivered to the bale case 404 through a duct (not shown) and a suitable stuffer mechanism (not shown).

In contrast to the baler of FIG. 9 which can only be run in a centered position directly behind the tractor 412, the in-line baler 10 of the present invention may be selectively operated in either a centered position of FIG. 5 or an offset position of FIG. 6. This is particularly beneficial in regions where the baler might be operated by either a high clearance tractor, which could readily clear the windrow 102 for operating the baler in the centered position, or a relatively low clearance utility vehicle which would not be capable of clearing the windrow 102 if the baler were operated in the centered position. Thus, where a low clearance utility vehicle is to be utilized for towing the baler of the present invention, the baler can simply be shifted over to its offset position of FIG. 6, permitting the vehicle to be run alongside the windrow 102 instead of straddling it. It will be noted that a simple extension or retraction of the swing cylinder 72 prepares the baler 10 for either centered or offset baling operations.

It is to be noted that even when the baler 10 of the present invention is operated in its offset position of FIG. 6, there is no problem with severe drive line angles because there is no mechanical drive line leading from the towing vehicle 64 to the baler. All driving power is supplied by the onboard engine 82.

Moreover, even though a significant weight transfer takes place when the baler is shifted to its offset position of FIG. 6, i.e., much of the weight shifts to the right outboard ground wheel 16, a significant portion of the weight transfer that would otherwise occur is counteracted by the fact that the engine 82 and its affiliated drive apparatus are located on the left side of the center line 20. By having the center of gravity 100 so located, the amount of additional weight borne by the outboard ground wheel 16 when the baler 10 is in its offset position is kept within an acceptable limit. Thus, the in-line, offsetable baler of the present invention provides a degree of flexibility and performance not heretofore available in in-line balers.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, instead of the illustrated arrangement in which the baler is designed to have its offset operating position located to the right of the center line 20, the baler could be designed to be offset to the left of the center line 20 during baling operations. In this instance, the tongue pivot 70 would be disposed on the right side of the center line 20, and the various, relatively heavy drive-related components of the machine would likewise be located on the right side of the center line 20 such that the center of gravity of the machine would be on the right side of the center line 20. This would prevent the left wheel 14, which would be the outboard wheel in this construction, from carrying an untoward amount of weight.

The inventor(s) hereby state their intent to rely on the Doctrine of Equivalents to determine and assess the reasonably fair scope of his/their invention as pertains to any apparatus not materially departing from but outside the literal scope of the invention as set out in the following claims.

We claim:

1. In an in-line, rectangular baler having its crop pickup, fore-and-aft baling chamber and compacting plunger located on the same fore-and-aft axis as viewed in top plan, the improvement comprising:

a wheeled chassis supporting the pickup, the baling chamber and the plunger;

a tongue projecting forwardly from the chassis and having a hitch at the forward end thereof for connection with a towing vehicle, said tongue being selectively swingable laterally between a centered location in which the hitch is located generally on said axis for conducting baling operations with the baler in a centered position behind the vehicle and an offset location in which the hitch is disposed laterally offset from said axis for conducting baling operations with the baler in an offset position behind the vehicle; and structure for releasably holding the tongue in a selected one of said locations.

2. In an in-line rectangular baler as claimed in claim 1, said structure including a pair of spaced-apart stops disposed to limit travel of the tongue at opposite ends of its path of swinging travel and apparatus for releasably holding the tongue against one or the other of said stops.

3. In an in-line rectangular baler as claimed in claim 2, said apparatus comprising a fluid-pressure piston and cylinder assembly operably coupled with the tongue.

4. In an in-line rectangular baler as claimed in claim 1, said hitch being offset to the left of said axis when the tongue is in said offset location as viewed from the rear of the baler.

5. In an in-line rectangular baler as claimed in claim 4, said tongue having a pivotal connection with the chassis which is spaced leftwardly from said axis whereby to render the baler suitable for offset baling operations on the right side of the towing vehicle when the tongue is in said offset location.

6. In an in-line rectangular baler as claimed in claim 5, the baler having a center of gravity that is disposed to the left of said axis.

7. In an in-line rectangular baler as claimed in claim 6, said chassis having a transverse axle with a pair of ground wheels at opposite ends thereof, said center of gravity being located in front of said axle.

8. In an in-line rectangular baler as claimed in claim 7, said pivotal connection between the tongue and the chassis being disposed above the pickup and below the baling chamber.

9. In an in-line rectangular baler as claimed in claim 1, said tongue having a pivotal connection with the chassis which is spaced leftwardly from said axis whereby to render the baler suitable for offset baling operations on the right side of the towing vehicle when the tongue is in said offset location, said pivotal connection between the tongue and the chassis being disposed above the pickup and below the baling chamber.

10. In an in-line rectangular baler as claimed in claim 9, the baler having a center of gravity that is disposed to the left of said axis.

11. In an in-line rectangular baler as claimed in claim 1, the baler having a center of gravity that is disposed off to one side of said axis corresponding to the side on which the hitch is located when the tongue is in said offset location.

12. In an in-line rectangular baler as claimed in claim 11, said hitch being offset to the left of said axis when the tongue is in said offset location as viewed from the rear of the baler.

13. In an in-line, rectangular baler having its crop pickup, fore-and-aft baling chamber and compacting plunger located on the same fore-and-aft axis as viewed in top plane the improvement comprising:

a wheeled chassis supporting the pickup the baling chamber and the plunger;

a tongue projecting forwardly from the chassis and having a hitch at the forward end thereof for connection with a towing vehicle, said tongue being selectively swingable laterally between a centered location in which the hitch is located generally on said axis for conducting baling operations with the baler in a centered position behind the vehicle and an offset location in which the hitch is disposed laterally offset from said axis for conducting baling operations with the baler in an offset position behind the vehicle; and structure for releasably holding the tongue in a selected one of said locations, the baler having a center of gravity that is disposed off to one side of said axis corresponding to the side on which the hitch is located when the tongue is in said offset location, said plunger and said pickup receiving operating power from an engine carried by the chassis, said engine being disposed off to one side of said axis corresponding to the side on which the hitch is located when the tongue is in said offset location.

14. In an in-line rectangular baler as claimed in claim 13, said chassis having a transverse axle with a pair of ground wheels at opposite ends thereof, said center of gravity being located in front of said axle.

* * * * *